United States Patent [19]

Mani

[11] Patent Number: 5,103,719
[45] Date of Patent: Apr. 14, 1992

[54] APPARATUS FOR THE MANUFACTURE OF FLAT BREAD WITH NOTCHES THEREIN

[75] Inventor: Daniel Mani, Los Angeles, Calif.

[73] Assignee: Simon Mani, Vernon, Calif.; a part interest

[21] Appl. No.: 596,335

[22] Filed: Oct. 12, 1990

[51] Int. Cl.⁵ .................................................. A23P 1/00
[52] U.S. Cl. .................................. 99/450.2; 99/450.1; 99/485; 99/537
[58] Field of Search ............... 99/349, 353, 355, 372, 99/373, 484, 485, 509, 510, 537, 538, 567, 450.1, 450.2; 426/128, 496; 83/866, 867, 870, 872, 876, 884, 886, 867, 879

[56] References Cited

U.S. PATENT DOCUMENTS

| | | | |
|---|---|---|---|
| 3,277,846 | 10/1966 | Kesselman | 99/537 |
| 3,869,975 | 3/1975 | Seewer | 99/450.2 |
| 4,526,093 | 7/1985 | Fogerson | 99/584 |
| 4,800,807 | 1/1989 | Mani | 99/537 |
| 4,889,043 | 12/1989 | Mani | 99/450.1 |

Primary Examiner—Timothy F. Simone
Attorney, Agent, or Firm—Blakely Sololoff Taylor & Zafman

[57] ABSTRACT

An apparatus for the manufacture of pita bread having predetermined pressure relief notches or slits along the perimeter thereof is disclosed. The apparatus includes a cylindrical roller having disposed on the surface thereof substantially circular blades shaped to proved the pressure relief area, including one or more notches or slits. The apparatus may also be provided with a pita perforating device, which will align with the notches or slits. In this arrangement, pita made by the apparatus and process has notches or slits which act as markers and assist in the beginning tearing of the perforations. The notches also act as preferred locations for rupturing during the baking to prevent the loaf from rupturing along the perforations or elsewhere.

8 Claims, 3 Drawing Sheets

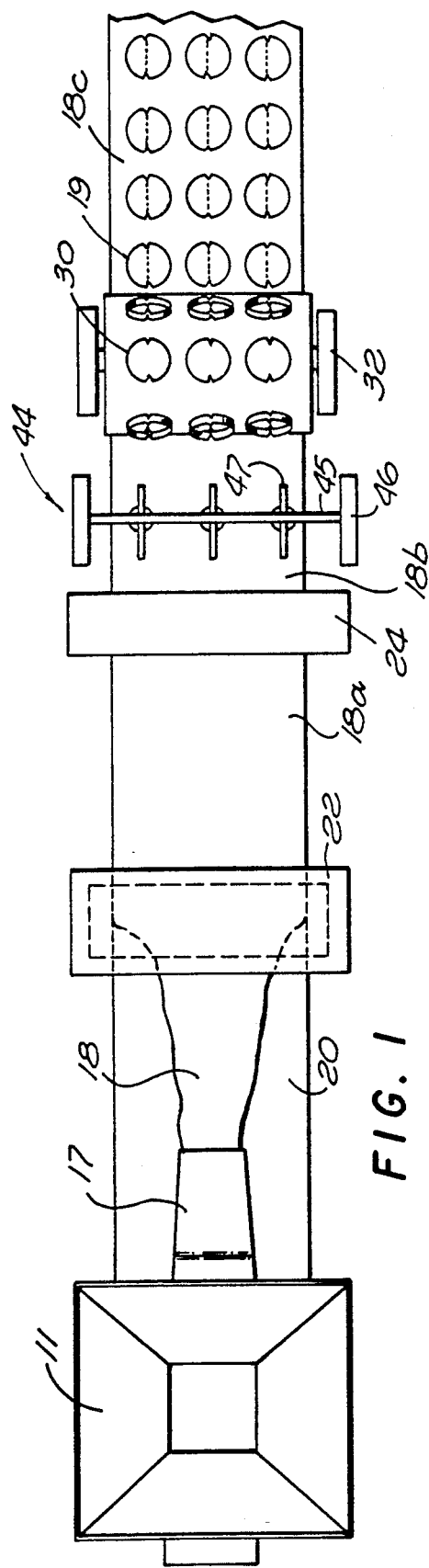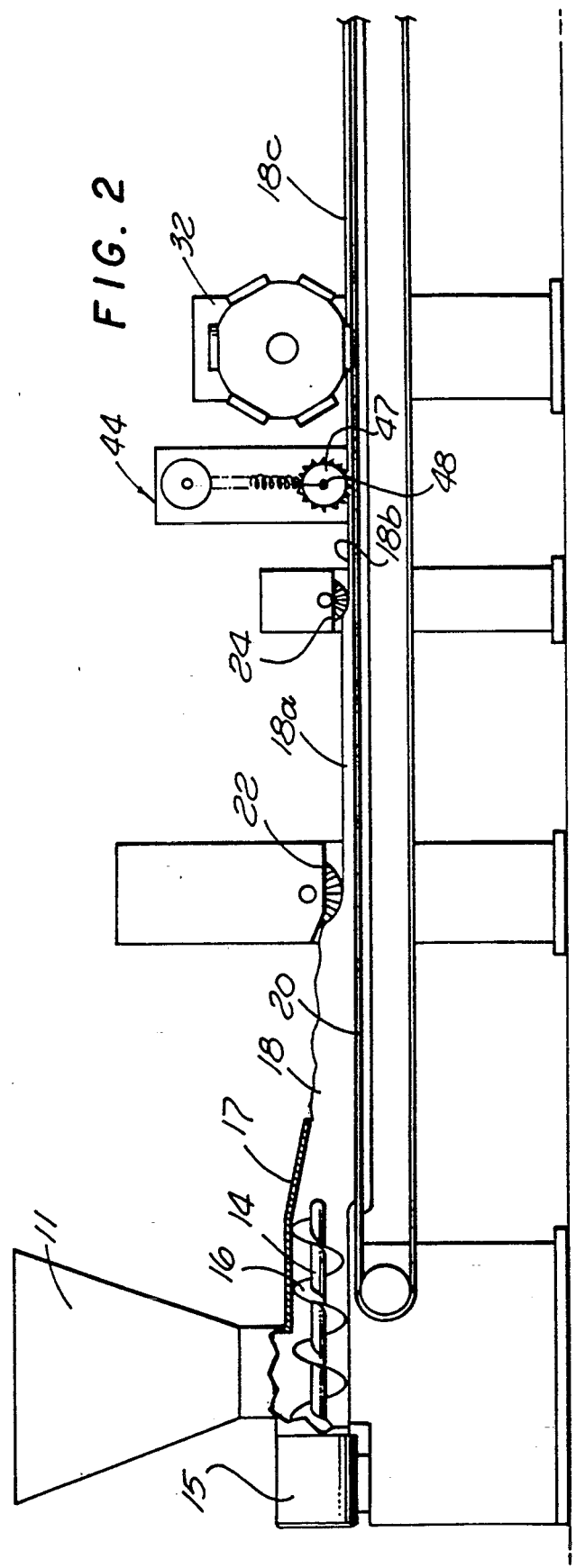

APPARATUS FOR THE MANUFACTURE OF FLAT BREAD WITH NOTCHES THEREIN

BACKGROUND OF THE INVENTION

1. Field of the Invention

This invention relates to an apparatus for the manufacture of flat bread, such as pita bread, having notches disposed therein to provide a preferential tear location and in pita bread, a preferential rupture area to provide a smooth unfaulted exterior thereon as a result of baking, a method of making such flat bread using an apparatus of the type described herein, and flat bread so made.

2. Art Background

There are several types of flat bread which are known today including lavash, and pita bread which is more well known. Pita bread, also known as pocket bread, is a bread of Middle Eastern origin dating back a number of centuries. In general, pita bread comprises a relatively flat bread having a generally rounded or oval shape and typically four to eight inches in diameter and one eighth to three eighths inches in thickness. An important aspect of the pita bread is that as a result of a specific baking process described in more detail below, a pocket or inner chamber is formed which can serve to hold various food ingredients such as meats, grains, vegetables, sauces and the like, both liquid and solid materials. Thus, pita bread is usually stuffed with these components and eaten.

Pita bread is a common staple in middle eastern countries and in recent years has enjoyed considerable and increasing popularity in other areas of the world. This popularity is due in part to the convenience of using pita bread for making a sandwich since the bread, when torn, forms a pocket which may be filled with meat, vegetables, cheese, and other edible material and is also often filled with sauces of various types.

Typically, the user will make a sandwich by tearing the pita bread in half, forming two semi-disks which can each be used to make a sandwich. Alternatively, the pita bread may be torn, cut, or otherwise severed to form a large and small disk segment, with the large disk segment being used to make a sandwich. Finally, not uncommonly, the pita bread may be cut or torn along one circular edge so that the entire pita bread may be filled with edible material to make a larger sandwich.

In the manufacture of pita bread, the components of the bread, basically comprising flour, water, yeast, sugar, and salt, as is known in the prior art, are mixed together in a large hopper. The dough made thereby is then allowed to rise. In some commercial systems the dough is then flattened and is formed or cut, usually on a conveyor system, into the shape of the flattened circular or oval bread product. In other commercial systems, it is rolled into the shape of a ball of dough and then flattened to form a large flat dough disk, like a large pancake. The pita bread in its flattened or circular shape is then allowed to rise slightly. It is thereafter baked in an oven on a flat support surface, typically at a temperature in excess of 500° Fahrenheit. This high temperature baking causes the outer surface of the bread dough to initially sear and thus sealing the surfaces of the dough. The dough in the center of the pita then bakes and, as a result thereof, liberates gas and steam from the dough. This gas and steam is entrapped within the seared outer surface thereby creating pressure within the dough so that it inflates. Since the gas is unable to escape, this internal pressure separates the upper and lower surfaces so that the pita bread resembles an inflated balloon. The inflation continues until the pita ruptures at its weakest location and the steam and gas created by the baking escape.

After baking, the pita bread is allowed to cool and the pita resumes its flat, pancake-like appearance. However, since the upper and lower surfaces of the pita bread were formed during the baking process, these surfaces remain distinct and separate.

A common use for pita bread is the formation of a sandwich. Typically, a user will tear the pita bread in half, forming two semi-disks of dough. These semi-disks will have a relatively straight edge on one side, exposing the two distinct layers of the pita bread, and will have a sealed semi-circular remaining edge. The user can then separate the layers along the torn or cut straight edge and spread these layers, forming a pocket with the pita bread half. Edible material such as meats, cheeses, etc, may be stuffed into the open pocket to form a sandwich. One reason for the popularity of this type of pita sandwich is the fact that the pita bread half forms a natural pouch which is relatively durable and thus not likely to spill when the sandwich is eaten, and which also has less bread than more common sandwiches, thus yielding a lower calorie sandwich.

Alternatively, sandwiches are typically formed with pita bread by cutting or tearing the pita bread at locations other than along its diameter. For example, it is not uncommon to form a sandwich by tearing along a cord of the pita disk removed from the diameter to form a large pocket segment and a small pocket segment, the large pocket segment used to make a single, larger sandwich from the pita bread. In addition, it is not uncommon to cut or tear the pita bread along a circular line following a portion of the circumference of the pita bread to make a single, large pocket from the entire pita bread, and thus a large sandwich.

Because the location of the baking-induced rupture in the pita bread is unpredictable, occurring at the weakest surface of the pita bread during the baking process, sandwiches formed in the above described manners virtually always include a rupture. Even when the pita bread is torn in half to make two sandwich pouches, one of these sandwich pouches will include a baking-induced rupture. The rupture may also occur across the tear or cutting line when the sandwich is made, leaving a torn edge at which the stresses induced during the sandwich making process will commonly cause further tearing and an unsightly sandwich. The rupture in the pita bread, of course, provides a location where sandwich filling material can easily leak or fall from the pita bread pocket and also causes a stress concentration point where further tearing of the natural pouch is likely. These undesirable results are a natural consequence of the pita baking process and have reduced, to some extent, the attractiveness of pita bread as a sandwich encapsulater.

An additional disadvantage of typical pita bread is the fact that, unless the bread is cut with a knife, tearing of the pita bread typically creates an uneven edge which follows the weak portions of the bread's surface. This increases the difficulty in making a neat appearing sandwich or pair of sandwiches from pita bread.

A major drawback in the manufacture of pita bread is that during the baking process, as the pocket inside the pita bread expands, the gases contained therein expand an uncontrolled amount thereby causing tears, breaks and crevices in the surface of the pita bread. This tends to cause substantial problems because such tears or crevices create permanent faults in the breads surface which can result in leaks of the food and sauces contained in the pocket after it is stuffed. Obviously, such leaks can be messy if the sauces, unbeknownst to the eater, leak out on the eater's clothing, hands and the like.

This problem of obtaining undesired faults in the surface of the pita bread was addressed in a United States Patent obtained by Goglanian (U.S. Pat. No. 4,597,979). Goglanian describes creating small holes in the surface of unbaked pita bread, preferably along the diameter thereof, so that when the perforated pita bread is baked, additional rupturing occurs on the surface thereof, which rupturing allows the escape of the gases inside the pita pocket. Goglanian also describes a number of devices for the manufacture of the invented pita, generally comprising multiple steps and manual perforation of each loaf.

There are a number of drawbacks to the Goglanian system in that the rupturing of Goglanian's pita is not well controlled. Specifically, the Goglanian perforated pita can rupture anywhere along the entire perforated surface. Moreover, rupturing is unnecessary for the production of perforated pita bread, and probably, as a practical matter, the rupturing does not always occur at the perforated site, or even at all. With regard to this last point it may be appreciated that the application of tiny holes to a major surface comprised of soft and malleable dough will not always be sufficient to define the rupture site. Of course, it would be appreciated by a person of ordinary skill in the art that it is most desirable to make a pita bread where the probable site of rupturing is well defined and certain.

Several patents owned by the assignee of the present application propose several system which are improvements over the Goglanian patent in the method and apparatus for making pita bread. U.S. Pat. No. 4,889,043 discloses an apparatus for making pita bread comprising a conveyor belt for carrying the pita dough in a long flattened sheet thereon, a cylindrical roller having a circular blades on its surface for cutting out the circular flat pitas, and a circular sawtooth blade disposed adjacent and perpendicular to the conveyer so that the blade perforates the pita dough as it is transported past the blade. The method of making pita bread using the aforementioned device is also disclosed.

A similar device is disclosed in U.S. Pat. No. 4,800,807, which discloses the same cylindrical roller with circular blades on its surface, and instead of the circular sawtooth blade, the circular blades have disposed therein along a chord of the circle, a flat sawtooth blade which perforates the pita dough.

In U.S. Pat. No. 4,775,543, a method of making pita bread with a pressure relief hole is described in which one pita bread is overlapped by an adjacent pita bread during the baking process so that the overlapped pita bread does not fully bake, and is therefore weaker than the baked portion thereof. Accordingly, each loaf of pita bread, when baked, has an intentionally weakened area which ruptures as the pocket expands. The area of the rupture is relatively large, the overlap preferably being about ½ inch. Also, the area of rupture includes a small portion of an end seam, so that it becomes desrible to cut off the ruptured portion of the pita in order to stuff it, since the ruptured area obviously cannot contain food, particularly liquids, therein.

The present device and process overcome the limitations of the prior art to produce a pita bread having the desirable characteristics of intentional and limited rupturing in a minimized location without the risk of uncontrolled rupturing or no rupturing at all. The present invention is also directed to flat bread generally having tear markers to indicate the location at which the flat bread should be torn and to begin the tear.

SUMMARY OF THE INVENTION

The present invention comprises an apparatus for the manufacture of notched or slit pita bread and the like wherein the notch or slit may define a pressure relief site during the baking of the pita bread, a process for making such notched pita bread and flat bread using the invented apparatus and pita bread and flat bread made thereby.

The apparatus of the present invention in its preferred embodiment creates pita bread loaves with predetermined areas of weakness forming a pressure relief site, or a plurality of pressure relief sites. The pressure relief sites are provided at the edges of the pita loaves. If multiple pressure relief sites are provided, it is preferably two sites on the perimeter of the pita loaf across from each other. In some cases it may be more than two pressure relief sites, generally formed in pairs across from each other. Also, in some embodiments of the present invention, the apparatus can be used to make pita loaves with perforations as is known in the prior art.

The pita loaves made by and according to the present invention are provided with pressure relief sites defined by notches or similar markers that make it easier to tear the pita loaf along the perforations provided therein. These notches provide both markers to indicate the starting points of the tear and starting points to facilitate easy tearing of the loaves without the use of knives or other sharp utensils to cut the loaves.

The present invention also encompasses an apparatus for making flat bread, such as lavash, having notches or slits therein to assist in tearing the bread. The present invention also comprises flat bread with the notches made according method of the present invention.

In one embodiment, the present invention includes a conventional type pita bread dough processor including a hopper for mixing the dough, a device for distributing the dough onto a conveyor system, a first roller for flattening the dough a first determined amount, a second roller for flattening the dough a second amount to approximately its final thickness, so that the dough after the second roller is a flat sheet approximating the width of the conveyor system. The dough is then passed under a cylindrical drum having disposed thereon pita cutters for cutting pita bread into the desired shape. The shape of the cutters is generally circular, and includes one or more slits, notches or similar configuration which has a minimal impact on the standard configuration of the pita loaf.

The invented drum is disposed on a spindle about which it rotates along with the conveyor belt and the spindle is disposed a predetermined distance above the conveyor belt such that the perimeter of the drum preferably engages the conveyor belt on which the pita dough travels thereby driving the drum. Disposed about the perimeter of the drum are the plurality of perforated pita cutters. Each pita cutter comprises generally a rounded, oval or substantially circular blade or cutting surface capable of cutting the dough into a round pita shape or other desired shape.

Perforations may also be provided in the pita loaves by any means known in the art, and if they are. In such embodiment, perforations are usually provided in a line across the diameter of the pita loaf. The notches, slits or such other pressure relief sites of the present invention are disposed at the each end of the perforations. The perforations, if provided, are of such depth and width so as to provide convenient exit of the gases produced therein during the baking to the outside to relieve the pressure therein without rupturing. Thus, the intended and preferred pressure relief site are the slits or notches.

As stated above, the perforations, if provided, may be made any of several ways known in the art. They may be made using a hand-held instrument, although the preferred method is automated. As is known in the art through my prior patents, the automated methods of making perforations is by means of a circular saw blade disposed in communication with the conveyor belt on which the pita loaf is disposed, or by providing saw tooth blades within the circular pita cutters.

The sawtooth shape is of the appropriate dimensions such that the perforations formed in the dough are of sufficient depth and width that when gases are formed in the dough during the baking thereof they inflate the dough to form the pocket therein, but otherwise, are incapable of causing the surface of the pita, particularly along the perforated line created by the pita cutter, to rupture. As such, evenly shaped perforated pita loaves are cut from the dough disposed on the conveyor. The pita cutters are disposed on the drum in a geometry to obtain a large number of perforated pita loaves per volume of dough. The remainder dough may be removed by hand or by machine, and returned to the hopper or elsewhere on the conveyor line.

In an alternate embodiment, a thin sheet of dough disposed on the conveyor system is first perforated with an appropriately positioned perforating blade such as a flat blade or a rotating wheel, and is then cut into its final rounded shape utilizing a pita cutter disposed on a rotating drum, as described above. However, in this embodiment, the perforating blade is lacking from the circular pita cutting blade. After the pita loaves are cut out and optionally perforated, they are then baked as is known in the art.

The pita loaves may also be made by hand or made by sheeting machines as is known in the art, wherein each loaf is first made into a ball, and then rolled out in two different directions as is known in the art to form a substantially round loaf.

In addition to the apparatus described herein, the present invention also comprises the method of making pita loaves and flat bread utilizing the apparatus described herein. The present invention further comprises pita loaves made in accordance with the process of the present invention and/or made with the presently invented apparatus described herein.

The present invention also comprises flat bread, the apparatus for making flat bread and the process for making flat bread, wherein the flat bread had notches or slits according to the present invention.

BRIEF DESCRIPTION OF THE DRAWINGS

FIG. 1 is a plan view of one embodiment of a conveyor for making perforated pita bread including the pita cutting device of the present invention.

FIG. 2 is a side view of the device shown in FIG. 1.

DETAILED DESCRIPTION OF THE INVENTION

Figure 3A:
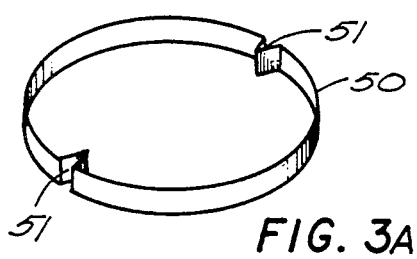
FIGS. 3A-3F are enlarged perspective views of various embodiments of the pita cutters of the present invention.

In accordance with the present invention, in one embodiment thereof, each pita loaf is formed to be substantially circular with one or more notches, slits or similar weakened areas provided along the circumference, and slightly inward therefrom. If perforations are provided therein, preferably along a chord or the diameter thereof, the notches, slits or the like are disposed at the edges of the perforations. In this way a perforated pita bread or flat bread is formed which can be easily separated into two sections, or multiple sections depending upon the number and arrangement of the notches, by simply tearing the bread apart at the notches or slits which provide both a marking and a starting place for the tear. If the perforations are provided along the diameter, each section has its pocket exposed that it can be filled or stuffed with various foods according to its customary use. If the perforations are provided along a chord near the perimeter of the pita loaf, as is known in the art, a single loaf having a large pocket is created. In the latter case, the smaller piece may be used as a bottom inner insert for the larger piece.

The pita bread may also be square, rectangular or any other shape and the shape of the pita bread so made can be hand-formed or machine made by a mold or any other process known in the art. The perforation which may be disposed in the pita loaves may be made by a perforating wheel or die cut, as is known in the art.

A second function of the notches or slits is to allow hot air and gases which are formed during baking to escape so that while the perforated pita bread rises and the pocket is filled with gases during its formation there is no rupturing of any of the surface of the perforated pita bread, even along the perforated line, because the gases can escape through the weakened area created by the notches or slits.

The essence of the invention is shown, for example, in FIGS. 3A-3F and 4A-4F. However, in order to understand the invention, it is important to first understand its overall operation, which will first be explained.

As used in the prior art, apparatus for manufacturing and baking pita bread typically comprises first a mixer to blend the various ingredients used in making pita bread dough. The mixed dough is allowed to rise somewhat and is then rounded and formed into individual spheres of dough, which are then transported on a conveyor to rising or proofing apparatus. In the rising or proofing apparatus the dough balls are subjected to warm temperatures so that the dough will rise to form larger spheres. These spheres or balls are then transported on conveyor belts and pass beneath a first set of rollers which form the balls or spheres into flat oval shapes resembling oval pancakes.

The dough is then conveyed in a direction which is perpendicular to the direction of transportation to the first roller and the dough passes under a second roller which forms the circular flat shape typical of round pita loaves. The pita bread is then ready for baking and, if baked in this form, would yield typical pita bread.

As the dough bakes, steam and other gas is formed by the baking process. This steam and other gas is captured within the dough and causes the dough form to inflate, separating the upper and lower surfaces of the pita bread into two distinct layers. The pita bread is then cooled. During this cooling, the bread again flattens into the characteristic pita bread shape. After cooling, the pita bread is stacked and packaged for sale.

Now referring to the drawings, as shown in FIGS. 1 and 2, a standard conveyor system which is used for the manufacture of pita bread is disclosed in which there is first shown a hopper 11 in which the pita dough made in a separate assembly is placed. The dough may be filled therein to a desired level so that a proper flow of pita dough is fed to the remainder of the system. The dough 13 travels through the hopper 11 to an auger 14 having spiral threads 16 thereon. The auger 14 is driven by a motor drive 15 which drives the dough 18 through chute 17 onto conveyor 20. The pita then goes under roller 22 which flattens the dough 18a into a flat sheet of predetermined thickness. Roller 24 disposed further along conveyor 20 flattens the dough 18b to approximately the desired thickness prior to baking. The resulting dough 18b from roller 24 is then passed under cutter roller 32 which cuts the pita loaves 19 out of the dough 18b.

As shown in FIG. 1, pita cutters 30 are disposed in alignment across rows along cutter roller 32 and each row contains three pita cutters. It will be obvious from one skilled in the art that the precise placement and spacing of the pita cutters can vary without departing the spirit or scope of the present invention.

After the perforated pita loaves are cut from the dough, the remainder of the dough 18c can be removed and recycled or otherwise disposed of. The cut loaves 19 are then run through a pita oven as is standard in the art and the pita loaves are allowed to rise and form pockets therein accordingly.

As shown in FIG. 1, a perforating means 44 may optionally be provided, and if it is provided, it may be disposed prior to the pita cutter 30, although it will be appreciated by a person of ordinary skill in the art that the perforating means can be disposed along the conveyor system subsequent to the pita cutter, or the pita loaves may be perforated by hand or other means known in the art.

The perforating means 44 comprises a horizontal support bar 45, vertical support bars 46 and saw toothed wheels 47 disposed on spindles 48 so that they can freely rotate from the force applied by the dough thereon. The perforating means 44 is preferably aligned with the pit cutters 30 so that the perforations are placed in the correct position on the pita loaves.

In an alternative embodiment known in the art and not shown, the pita cutter can have a sawtooth member disposed therein to provide perforations as the pita is cut. The teeth of each pita cutter are preferably 1/16 to ⅛ inches deep and there are approximately 6 teeth per inch across a diameter of 4 to 5 inches. The teeth are preferably rounded or flat, rather than pointed at the top thereof. of course the frequency, size and shape of the teeth can vary greatly, with the understanding that they are intended to be of sufficient depth and geometry so as to prevent rupturing of the pita loaf along the perforated line during baking. Of course, it will be appreciated that it is not necessary for the perforations to be provided along the diameter and that they can in fact, be provided along a chord of the substantially circular or oval pita bread if a larger size pita pocket is desired.

Figure 3B:
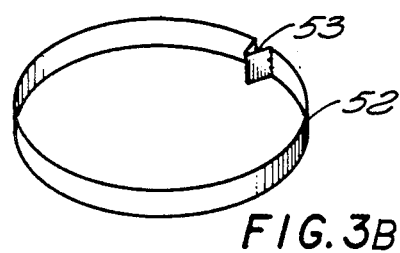
Figure 3C:
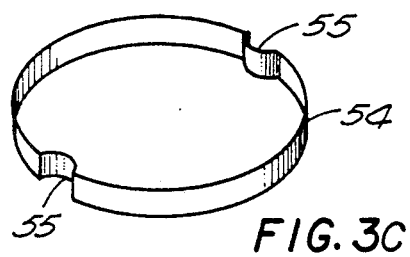
Figure 3D:
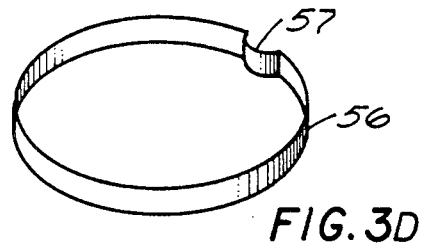
Figure 3E:
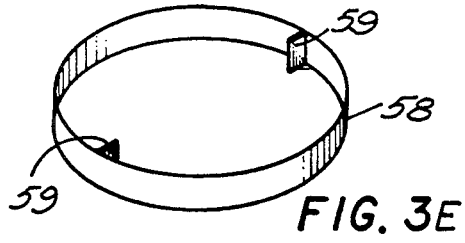
Figure 3F:
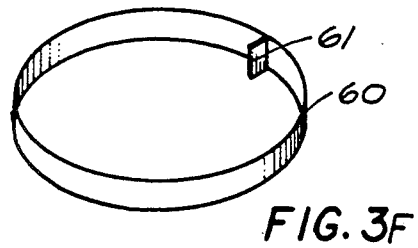
Figure 4A:
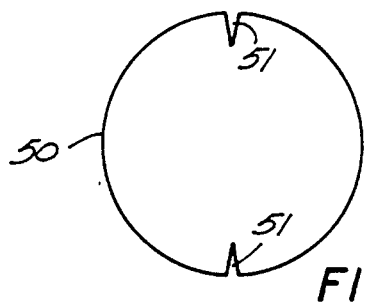
FIGS. 4A-4F are plan views of the various embodiments of the pita cutters of the present invention.

FIGS. 3A and 4A show variations of the pita cutter shown in FIG. 1. It will of course be recognized that the pita cutters of FIGS. 3A-3F and 4A-4F can be interchanged with the embodiment shown in FIG. 1 without departing from the spirit and scope of the present invention.

Figure 4B:
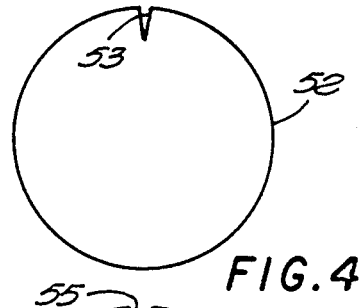
Figure 4C:
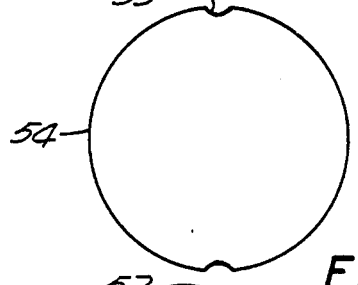
Figure 4D:
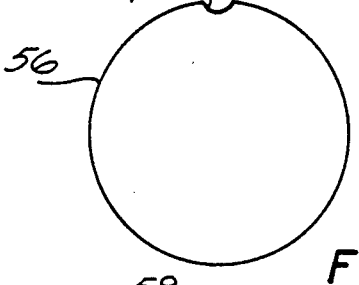
Figure 4E:
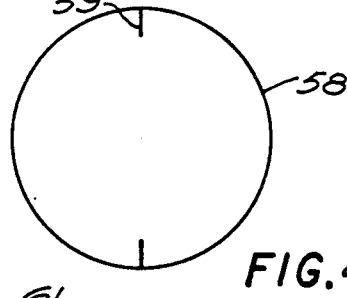
Figure 4F:
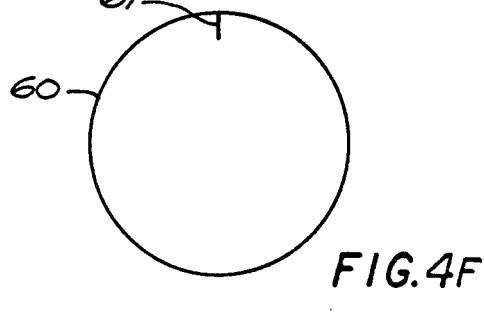

As shown in FIGS. 3A and 4A, the cutter 50 can have two triangular shaped notches 51. As shown in FIGS. 3B and 4B, the cutter 52 can have one triangular shaped notch 53. As shown in FIGS. 3C and 4C, the cutter 54 can have two rounded shaped notches 55. As shown in FIGS. 3D and 4D, the cutter 56 can have one rounded shaped notches 57. As shown in FIGS. 3E and 4E, the cutter 58 can have two slits. 59. As shown in FIGS. 3F and 4F, the cutter 60 can have one slit 61. It will be appreciated by a person of ordinary skill in the art that other shapes of notches and slits can be used without departing from the spirit and scope of the present invention.

Figure 5:
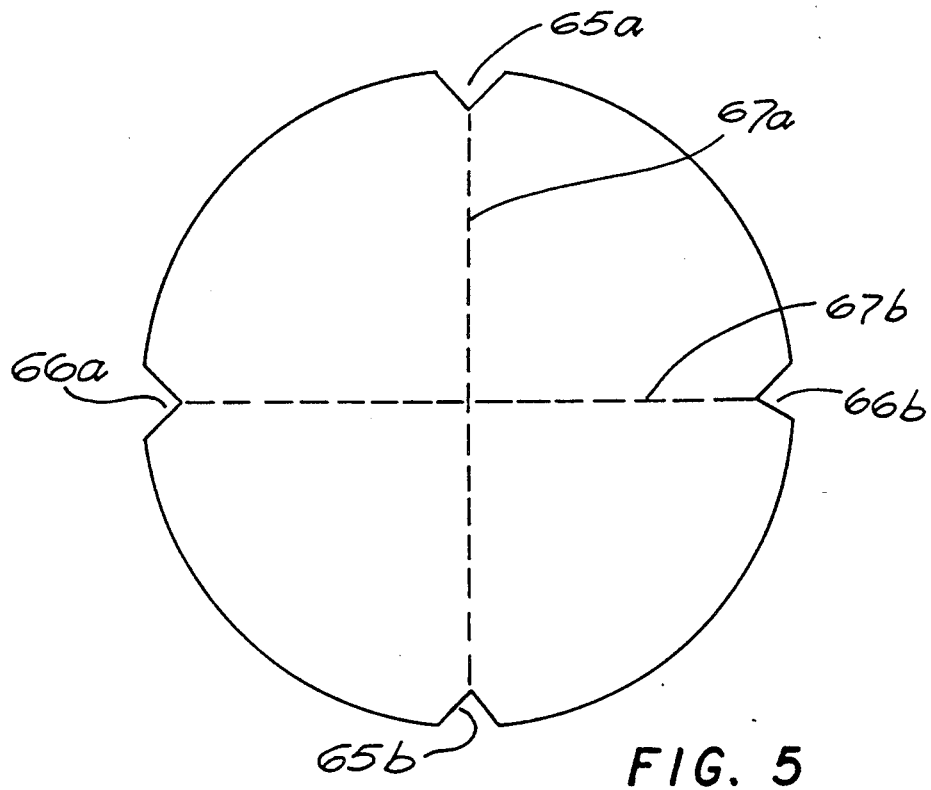
FIG. 5A is a perspective view of another embodiment of a pita cutter of the present invention and FIG. 5B is a plan view of the pita formed thereby.

As shown in FIG. 5, a pita made in accordance with the present invention can have 4 notches 65a, 65b, 66a and 66b set out in two pairs disposed across the diameter of the pita from each other and two perforation lines 67a and 67b. In this embodiment the pita can be easily split into quarters and if desired, the pieces can be used to fill other pita sandwiches or otherwise used as needed.

Figure 6:
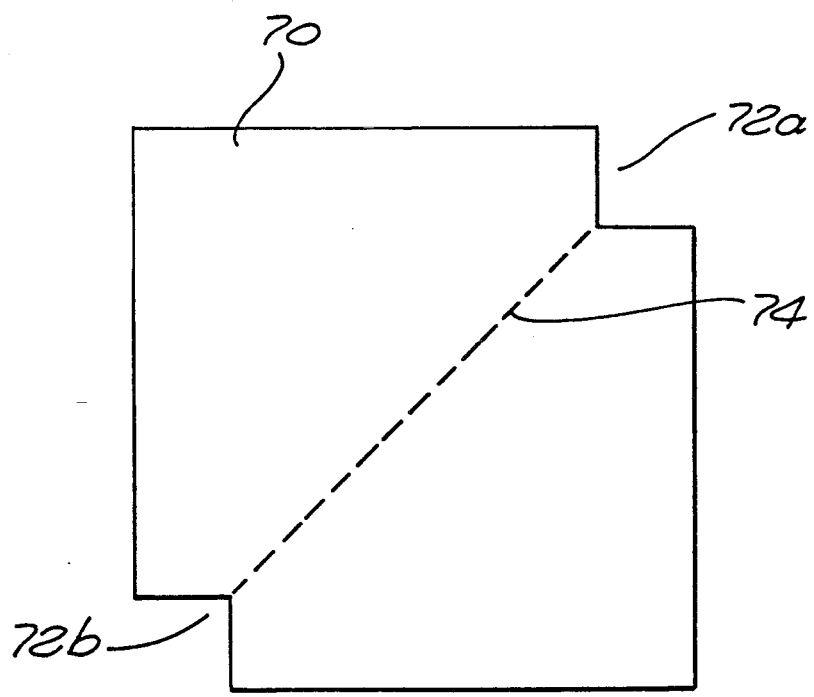
FIG. 6 is a plan view of another embodiment of a pita formed in accordance with the present invention.

As shown in FIG. 6, the pita or flat bread according to the present invention does not have to be round but can be any other regular or irregular shape, including square. FIG. 6 depicts a square flat bread or pita bread 70 having two notches 72a and 72b and a perforated line 74.

It would be obvious to a person of ordinary skill in the art that a number of changes and modifications can be made to the existing apparatus and process without departing from the spirit and scope of the present invention. It is contemplated that the present invention is encompassed by the claims as presented herein and by all variations thereof coming within the scope of equivalents accorded thereto.

What is claimed is:

1. In a pita bread manufacturing apparatus of the type having a conveyor system and providing a flat sheet of dough on said conveyor system having a predetermined thickness, the improvement comprising a pita cutter comprising a cylindrical wheel rotatably mounted above said conveyor system with the circumferential surface thereof passing near said conveyor system, said wheel having disposed on the circumferential surface thereof a plurality of substantially circular, pita cutting blades which come in contact with said conveyor system when disposed adjacent thereto for cutting substantially circular pita dough from said flat sheets of dough, said blades having disposed therein at least one pressure relief cutting means comprising a generally triangular shaped cutout, whereby a pita loaf is formed which during baking preferentially ruptures at the site created by said pressure relief cutting means.

2. In a pita bread manufacturing apparatus of the type having a conveyor system and providing a flat sheet of dough on said conveyor system having a predetermined thickness, the improvement comprising a pita cutter comprising a cylindrical wheel rotatably mounted above said conveyor system with the circumferential surface thereof passing near said conveyor system, said wheel having disposed on the circumferential surface thereof a plurality of substantially circular, pita cutting blades which come in contact with said conveyor system when disposed adjacent thereto for cutting substantially circular pita dough from said flat sheets of dough, said blades having disposed therein at least one pressure relief cutting means comprising a generally semicircular cutout, whereby a pita loaf is formed which during baking preferentially ruptures at the site created by said pressure relief cutting means.

3. The pita bread manufacturing apparatus of claim 1 wherein said pressure relief cutting means comprises two cutouts in said blade disposed on opposite sides of said blade from each other and disposed to form two notches opposite each other in said pita dough.

4. The pita bread manufacturing apparatus of claim 2 wherein said pressure relief cutting means comprises two cutouts in said blade disposed on opposite sides of said blade from each other and disposed to form two notches opposite each other in said pita dough.

5. The pita bread manufacturing apparatus of one of claims 1 through 4 further comprising a perforating means.

6. The pita bread manufacturing apparatus of one of claims 3 and 4 further comprising perforating means arranged to place a line of perforations in said pita dough so that said line of perforations connects both of said pressure relief cutting means.

7. The pita bread manufacturing apparatus of one of claims 1 and 2 wherein a single cutout is provided.

8. The pita bread manufacturing apparatus of one of claims 1 or 2 further comprising a single cutout and a perforating means adjacent said single cutout.

* * * * *